Figure 1:
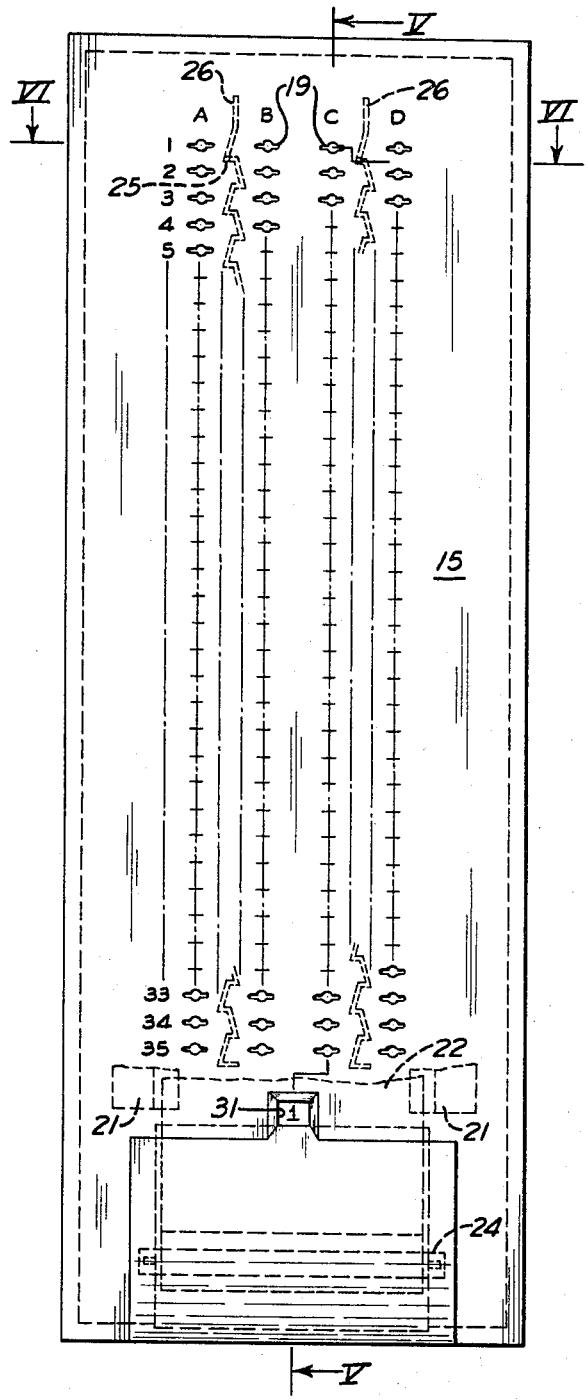

Oct. 25, 1966   C. H. JOHNSON, JR   3,280,482
TESTING AND SELF-INSTRUCTIONAL DEVICE AND METHOD
Filed Dec. 17, 1963                5 Sheets-Sheet 1

INVENTOR.
CHESTER H. JOHNSON, JR.
BY
Brown, Critchlow, Flick & Peckham,
ATTORNEYS.

Oct. 25, 1966   C. H. JOHNSON, JR   3,280,482
TESTING AND SELF-INSTRUCTIONAL DEVICE AND METHOD
Filed Dec. 17, 1963   5 Sheets-Sheet 2

INVENTOR.
CHESTER H. JOHNSON, JR.
BY
Brown, Critchlow, Flick & Peckham.
ATTORNEYS.

INVENTOR.
CHESTER H. JOHNSON, JR.
BY
Brown, Critchlow, Flick & Peckham
ATTORNEYS.

Oct. 25, 1966  C. H. JOHNSON, JR  3,280,482
TESTING AND SELF-INSTRUCTIONAL DEVICE AND METHOD
Filed Dec. 17, 1963  5 Sheets-Sheet 4

INVENTOR.
CHESTER H. JOHNSON, JR.
BY
Brown, Critchlow, Flick & Peckham.
ATTORNEYS.

Oct. 25, 1966 C. H. JOHNSON, JR 3,280,482
TESTING AND SELF-INSTRUCTIONAL DEVICE AND METHOD
Filed Dec. 17, 1963 5 Sheets-Sheet 5

Fig. 10

INVENTOR.
CHESTER H. JOHNSON, JR.
BY
Brown, Critchlow, Flick & Peckham.
ATTORNEYS.

United States Patent Office

3,280,482
Patented Oct. 25, 1966

3,280,482
TESTING AND SELF-INSTRUCTIONAL DEVICE
AND METHOD
Chester H. Johnson, Jr., 317 Westridge Drive,
Menlo Park, Calif.
Filed Dec. 17, 1963, Ser. No. 331,299
11 Claims. (Cl. 35—48)

This invention provides a mechanical educational device that may be used either as a testing device or as a teaching device. The invention also provides a new electro-mechanical method of scoring such teaching exercises.

When using the device for testing purposes, it can be used in giving objective tests (multiple-choice or true-false). In such tests a card pre-punched with the correct response to each question is inserted in the device, which is then given to the student. The student, using a special stylus, selects one of the available holes opposite the number of the question, and inserts the stylus through the selected hole. This insertion of the stylus punches a rectangular hole in the card and simultaneously shifts a shuttle so that it exposes the row of holes opposite the next question.

The shuttle and its operating means, which is preferably a wide, flat piece of spring steel, provides means which force the student to punch a response to each question; prevent the student from responding out of sequence; and inform the student of the number of next question to be answered.

As the result of this construction and arrangement, the student must punch an answer for every question, and the existence of a double punch in a given horizontal row (i.e., the original pre-punched hole plus a wrong punch by the student) indicates a wrong answer. This "double-punch=wrong" system simplifies the machine collating of the punched cards, as will be explained more fully.

When using the device as a teaching machine, the parts are changed in such a way that the shuttle will not advance to the answer row for the next question until the student has given the correct answer. Thus the student must keep punching answers until he selects the correct answer, at which time the shuttle will emit a clicking noise as it advances to the next question.

The subsequent machine scoring of a card used in this teaching technique will indicate to the teacher the extent to which the steps of an instructional program (in the form of questions) have been successfully mastered by the student on the first try. The rapid machine scoring of cards thus marked will aid in the evaluation of the success that large numbers of students have had with individual items of an instructional program.

In either use of the recording device, i.e., in testing or in teaching, the resulting punched card can be collated in a relatively simple machine capable of recognizing and indicating when two or more punched openings have been made in answer to a single question. The use of the recording device in combination with such a collating machine provides a new and more flexible method for scoring and collating an educational exercise.

These and other objects and advantages of the invention will become apparent as the description proceeds.

Figure 2:
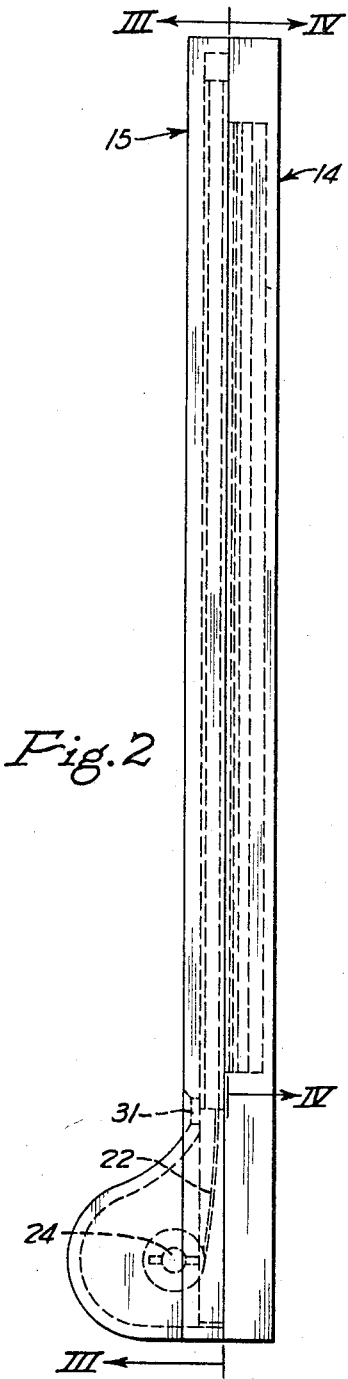
Figure 3:
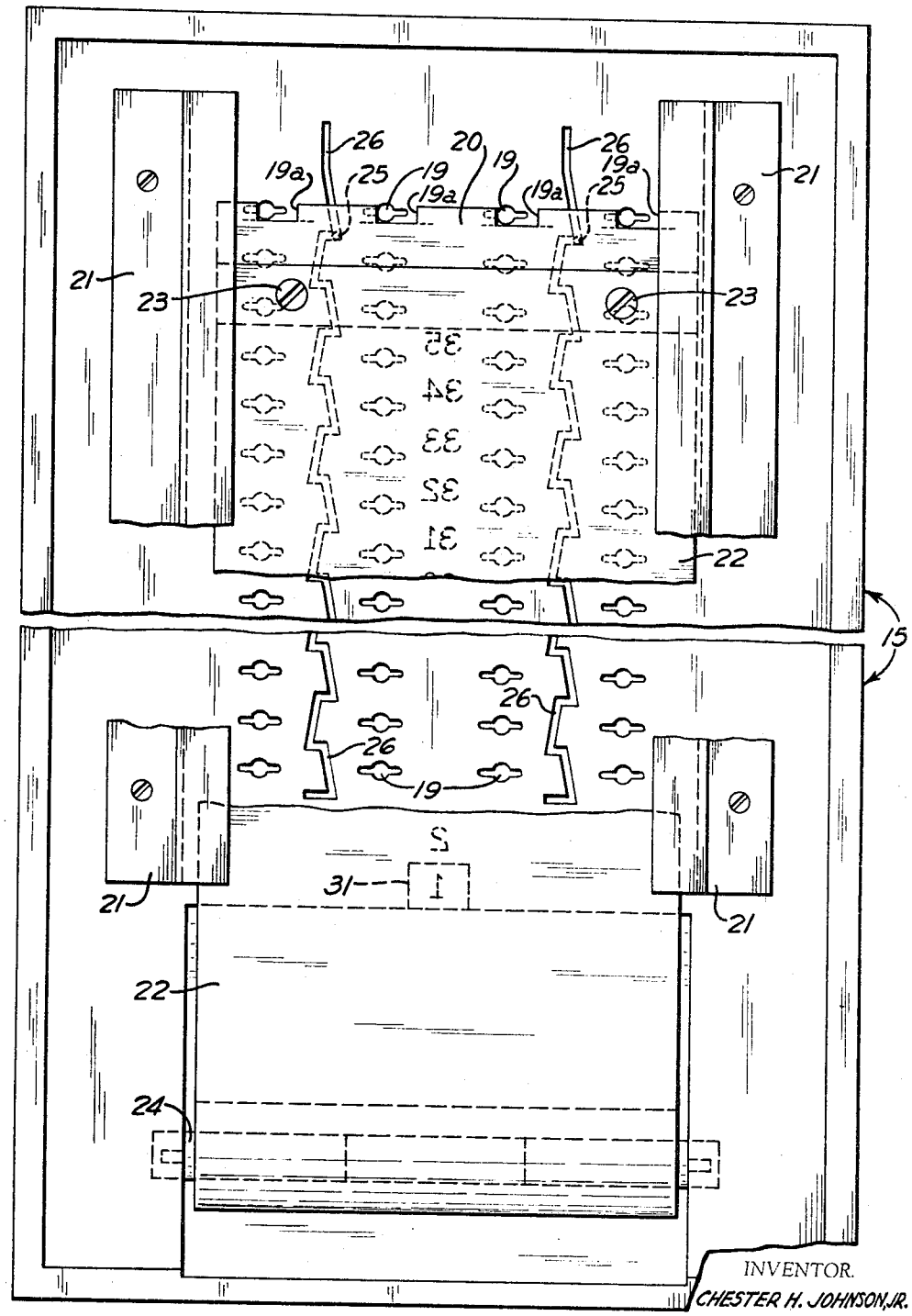
Figure 4:
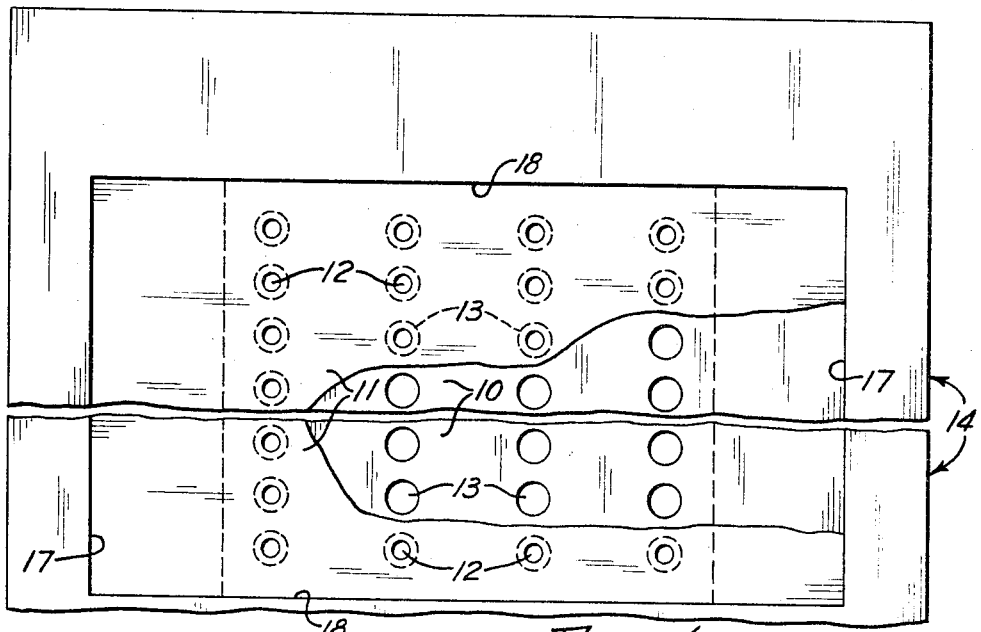
Figure 6:
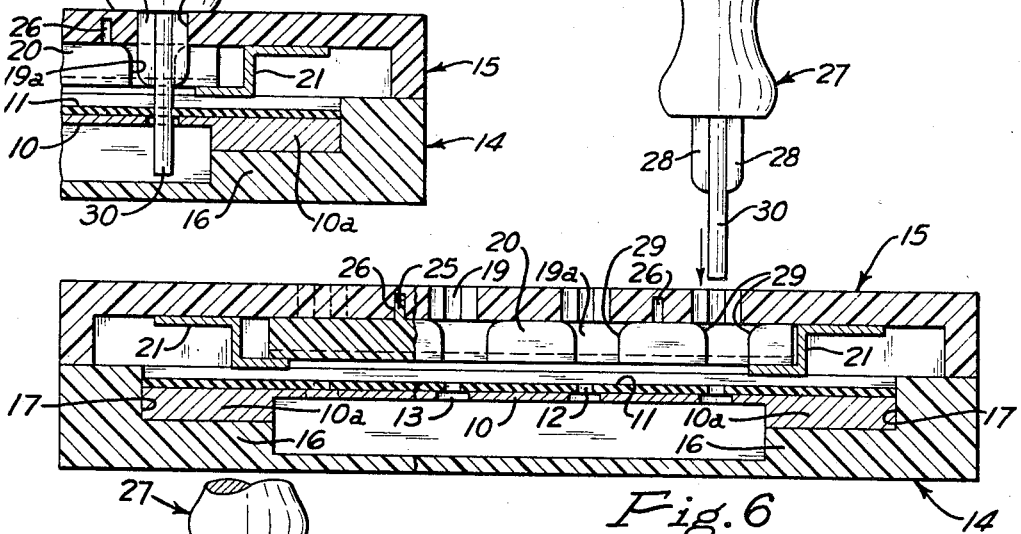
Figures 5, 9:
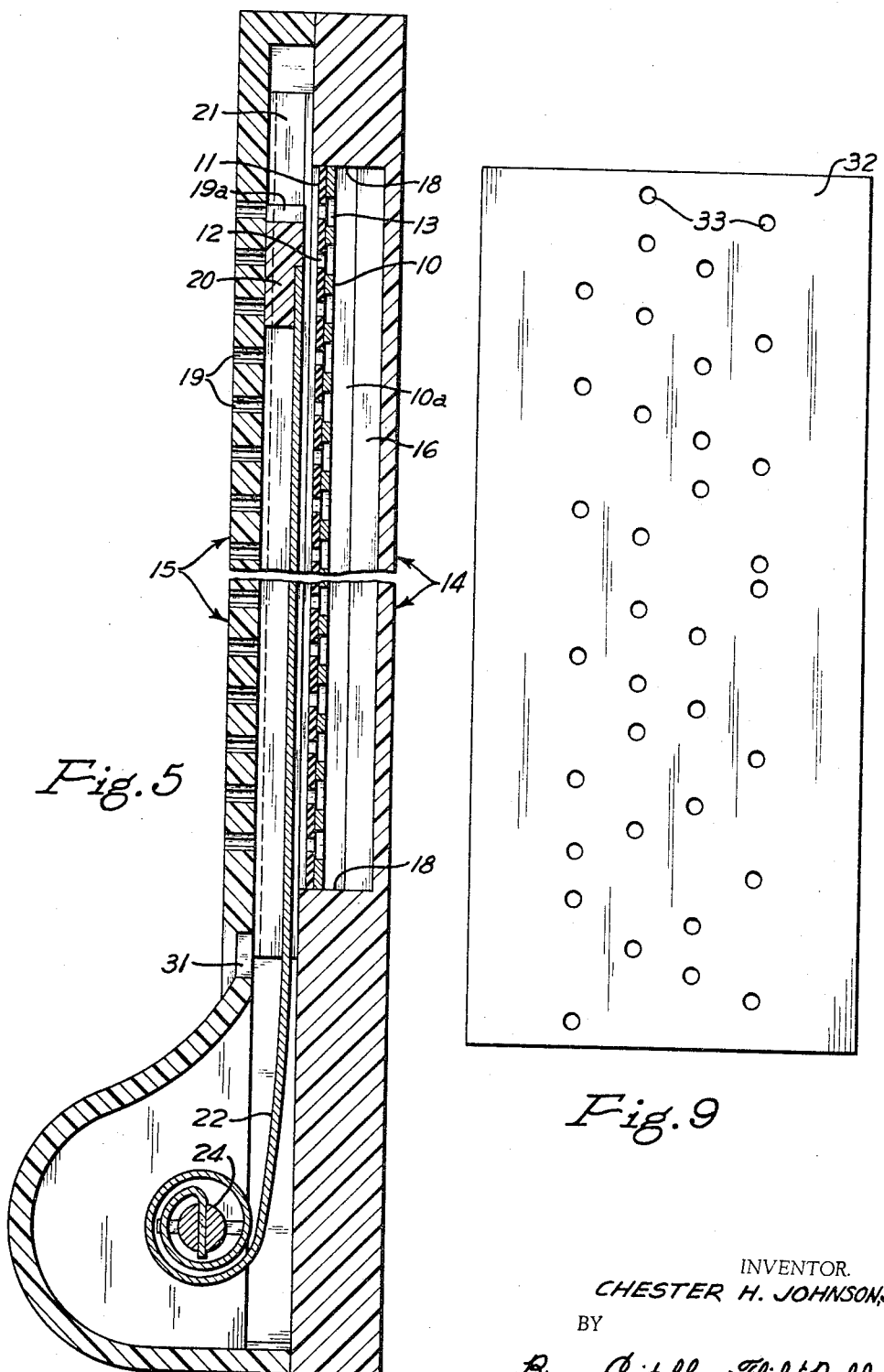

In the drawings:
FIG. 1 is a plan view of the recording device.
FIG. 2 is a side elevation of the device of FIG. 1.
FIG. 3 is a section taken on line III—III of FIG. 2.
FIG. 4 is section taken on line IV—IV of FIG. 2.
FIG. 5 is a section taken on line V—V of FIG. 1.
FIG. 6 is a section taken on line VI—VI of FIG. 1, but showing the stylus and other parts in position for testing.

Figure 7:
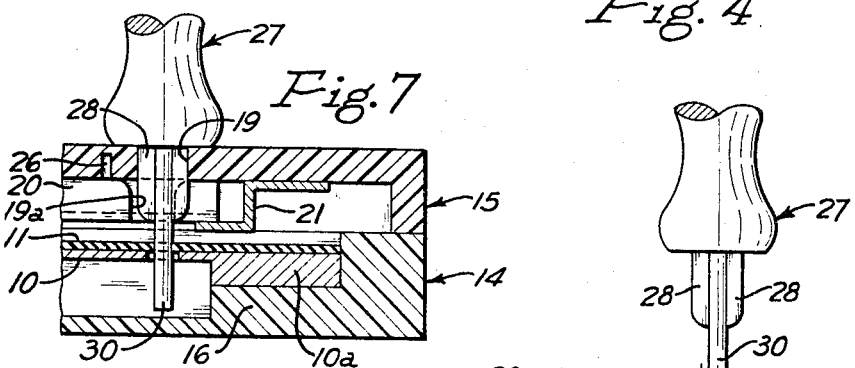
Figure 8:
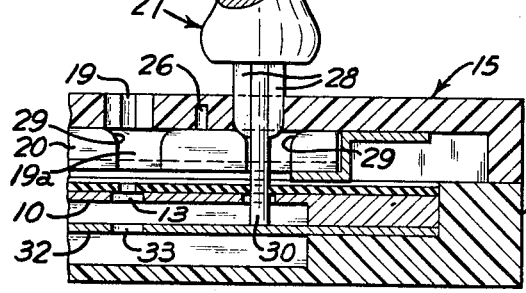

FIG. 7 is a partial section similar to FIG. 6, but showing the parts in position after an answer to a test question has been punched.
FIG. 8 is a view similar to FIG. 7 with the parts in teaching position.
FIG. 9 is a plan view of the answer template used in the teaching position of the device.
FIG. 10 is a plan view of the pre-punched punch card used in the device to record answers to a test.

It should be noted that FIGS. 1, 2 and 9 show the device in actual size, while the remaining figures show the device at double size in order to make clear certain details.

*General arrangement*

To facilitate illustration of the parts, the punch card used is not shown in position in the holder, but is illustrated separately in FIG. 10. This card is an adaptation of a well-known type provided with pre-scored or die-cut rectangles in the punching positions, to permit the desired punching of $\frac{1}{16}''$ x $\frac{1}{8}''$ rectangular holes by means of a stylus. For use in the present device the card is used vertically, and is die-cut for punching in 4 possible positions in each of 35 horizontal rows. It is, of course, possible to use a fewer or a greater number of rows. Each of the rows is used to locate a punched response to a multiple-choice, or true-false question given on an examination paper, the question being numbered to correspond with a number applied to a row of openings on the device.

As illustrated, 4 vertical rows of pre-scored rectangular chips are used, these vertical rows being lettered A, B, C and D respectively. Here again, it is possible to design the device so as to utilize a fewer, or a greater number of vertical rows, as desired.

FIG. 10 shows, by the shaded rectangular openings, that one of the chips has been punched from each of the numbered rows. This represents the pre-punching of the correct answers on a particular test.

The invention includes a punching plate which supports the punch card while it is held in the case of the recording device. This punching plate, best seen in FIGS. 4, 5 and 6, includes a metal support plate 10 and a resilient sheet 11 which is glued or bonded to the support plate 10. The resilient sheet 11 may be formed of rubber or any similar material. When the recording device is in use, the punch card is placed on top of the resilient sheet 11.

The resilient sheet 11 (see FIG. 4) is formed with rows of holes 12, which are aligned with rows of pre-scored chips on the punch card. In other words, there is a horizontal row of four holes 12 opposite each of the lines numbered 1 to 35 in FIG. 10, and the four holes in each row are aligned vertically to coincide with the vertical rows lettered A, B, C and D in FIG. 10. Each of the holes 12 is large enough to permit a chip to be punched through it.

The support plate 10 is formed with a hole 13 aligned with each of the holes 12 in the resilient sheet. The holes 13 are larger than the holes 12 in order to permit ready passage of the punched chip.

The recording device includes also a case or manual holder which holds the punch card and punching plate in proper registry with each other. The case includes a body 14 and a cover 15. These, and other related parts may be made of any suitable material, but it is presently preferred to make them of plastic.

As will be clear from FIG. 6, the punching plate sets down into the body and is supported by two side rails 16 in a position spaced from the bottom of the body. The punching plate is positioned laterally by ledges 17 (FIG. 6), and vertically by ledges 18 (FIG. 5), formed on the body 14. In use, the punch card is laid on top of the punching plate and is held in registry with the punching plate by the ledges 17 and 18.

The support plate 10 is provided on its under side with thickened flanges 10a along each vertical edge, These flanges 10a rest on the side rails 16 of the body, as shown in FIG. 6.

In order to permit punching of the card, the cover 15 is provided with a series of openings 19 (see particularly FIGS. 1 and 3) which, when the cover is in place on the body, register with the die-cut chips in the card and with the holes in the punching plate. When the special stylus is inserted through one of the openings 19, the corresponding chip of the punch card is pressed through the holes in the punching plate into the receptacle formed in the bottom of body 14.

A particular feature of the invention resides in the control shuttle which regulates access to successive lines of openings.

This control shuttle 20, shown especially in FIGS. 3, 5 and 6, is a rectangular member that is wider than the four vertical rows of holes in the punching plate. The shuttle is guided by two vertical guide strips 21 (FIGS. 3 and 6) which guide vertical movement of the shuttle, but which permit a limited amount of lateral shifting movement of the shuttle.

In FIGS. 3 and 5 the shuttle 20 is shown in its top position, with its upper edge in register with the top row of openings 19. The shuttle is biased downwardly by a flat steel spring 22 which is of the same width as the shuttle. The upper end of spring 22 is attached to the shuttle, as by the screws 23 (FIG. 3), and the lower end of the spring is wound around a fixed axle 24. The spring 22 is a constant-tension extension spring so mounted that when the shuttle 20 is pulled to its upper position, the spring is placed under tension tending to bias the shuttle toward its bottom position.

It will be clear from FIG. 3 that the shuttle together with the flat spring form an "obstructing means" which covers all of the rows of openings in the case below the one being worked on.

The downward motion of the shuttle 20 is controlled in stepwise fashion by means of two pins 25 carried by the shuttle and moving in zigzag grooves 26, which are formed on the inner surface of cover 15. When the shuttle is in the position illustrated, registering with test line No. 1, the pins 25 rest on horizontal flat portions of grooves 26.

It will be clear from FIG. 3 that the openings 19 in the cover have double-keyhole configuration, i.e., they have a central round hole with laterally extending slots. The operating stylus 27 (FIG. 6) has a similar cross-sectional shape with lateral fins 28, so that the stylus fits into the opening like a key in a keyhole.

The upper edge of the shuttle 20 is formed with four rectangular notches 19a spaced to correspond with the openings 19 of the cover. Each notch 19a has a width the same as the overall width of one of the openings 19 of the cover. Thus, when the notch 19a is properly aligned with the double-keyhole opening 19, the head of stylus 27 may pass through both of these openings.

FIG. 3 also shows that when the shuttle is in position No. 1, it is positioned to the right (as seen in this figure) so that the left-hand edges of the notches 19a cover the left-hand slots of each of the openings 19. The result is that when the stylus 27 is inserted in any one of the openings 19 of No. 1 row, the left-hand fin 28 of the stylus engages the left-hand edge of one of the notches 19a, thus shifting the shuttle toward the left, as seen in FIG. 3. This shift of the shuttle to the left will move the pins 25 off of the horizontal flats on which they have been resting, and permit them to move down inclined portions of the slots to the next horizontal flats, where the upper edge of the shuttle 20 will be registered with row No. 2. In this manner the shuttle will uncover the successive rows of pre-scored chips on the punch card.

It can be seen in FIG. 6 that the ends of the fins 28 of the stylus are rounded, and that the confronting edges 29 of the notches of the shuttle are also rounded, thus facilitating the lateral shifting of the shuttle as the stylus is pushed into the recording device.

The right-hand portion of FIG. 6 is a cross-section showing the three right-hand openings 19 of the cover, with the stylus poised to enter one of the openings.

The left-hand portion of FIG. 6 (beyond the breakaway lines) shows a pin 25 resting on the first horizontal flat of a zig-zag groove 26. See FIG. 1 for the section line on which FIG. 6 is taken.

FIG. 7 shows the position of the stylus after it has reached its fully inserted position. Here the shuttle 20 has dropped to the next position, and the central rod 30 of the stylus has punched the card (not shown) and has penetrated through the holes in the rubber sheet 11 and in the support plate 10 of the punching plate.

It should be noted that the geometry and dimensions of the mechanism are such as to make it impossible to activate the shuttle without simultaneously punching a hole in the punch card. This compels the student to answer each question in sequence.

It is also important that the student be kept advised of the number of the line he is working on, so that he can refer to the corresponding question on the test. This is provided for by placing a window 31 (FIGS. 1 and 5) in the cover 15 near the bottom. Numbers corresponding with the lines of the test are marked on the front face of the spring 22 and spaced so that the number appearing in the window indicates the number of the next question to be answered.

In this manner the shuttle is moved from line to line progressively as the questions are answered.

Use in giving tests

When using the recording device in giving a test, a punch card of the type illustrated in FIG. 10, with the correct answers pre-punched, is placed in the holder, the card being laid on top of the punching plate. The shuttle is then placed in position No. 1, and the cover is attached to the case. The recording device is then given to the student.

The student proceeds to take the test by punching an answer to question No. 1 on the first row of openings 19. Whereupon, the shuttle moves to position No. 2, and the numeral "2" appears in the window 31 at the bottom of the cover. The student is thus reminded that he is now working on question No. 2 of the test.

In this manner the student proceeds through all questions of the test.

After all students have completed the test, the cards are removed from the recording devices and may be collated in a machine to be described below. Due to the fact that the cards were pre-punched with the correct answers, any line on a card having two punched openings indicates an incorrect answer. This "double punch=wrong" provides an indication which can be collated by a simplified method, which is explained later herein.

Use as a teaching machine

By inserting the removable answer template 32 shown in FIG. 9, it is possible to use the recording device as a multiple-choice teaching machine. This template is a metal plate formed with holes 33 that are located at the positions of the correct answers. The use of the device as a teaching machine is illustrated in FIGS. 8 and 9.

In assembling the device as a teaching machine (see FIG. 8), the template 32 is inserted between the side rails 16 of the body, and the support plate 10 of the punching plate. The thickness of the side rails 16 and of the flanges 10a of the support plate may be such that the template 31 is supported approximately ⅛ in. above the bottom of the body, and lies approximately 3/32 in. below the bottom surface of the support plate 10.

The punching of an incorrect response is illustrated in FIG. 8. In this case the central rod 30 of the stylus has punched a hole in the card, and has penetrated through the punching plate. However, its inner end has come into engagement with the template 32, thus keeping the stylus from moving inwardly far enough to permit the fin 28 of the stylus to shift the shuttle. The result is that an incorrect answer has been punched on the card, but the shuttle remains at the same line.

If, on the next try the examinee should insert the stylus at a position corresponding with a hole 33 in the answer template, such position being shown at the left side of FIG. 8, the central rod will pass through the hole 33, the fin 28 will shift the shuttle to the left, and the shuttle will move on to the next line of the examination.

In this manner the student is provided with an immediate knowledge of whether he is right or wrong as he responds to each question. This immediate feedback of results is one of the major tenets of the new instructional techniques known generally as "programmed instruction." The student is instructed to respond to each question until the correct response is given. The shuttle will advance to the next row only after the correct response has been given, and the student is made aware of this by the clicking noise of the shuttle as it advances to the next row, and by the next question number appearing in window 31 (FIGS. 1 and 9).

When using the recording device as a teaching machine, it is not necessary to pre-punch the card with the correct answer, because the necessary conditions to fill the requirements of the "double punch=wrong" method are automatically present.

Thus, if the correct answer is punched on the first try, the machine moves on to the next answer, and this "single punch" answer will, in the collating, be recorded as a correct answer.

If, on the other hand, the correct answer is not punched on the first try, there will be two or more punches in that row on the card, and the machine response to any two or more punches is "wrong," as will be explained later herein.

The fact that pre-punching is not required when the device is used for teaching is an advantageous feature, since the student may successively insert any number of cards into the device to carry out instructional programs exceeding 35 questions in length. Obviously, this technique would not be feasible if the correct answers were visible on the cards.

In conventional methods of correcting cards used on teaching exercises it is necessary to provide a special template punched with the correct answers. Such a template is not needed in the method of the present invention.

The method of scoring

The object of designing the device to produce a plurality of holes for each incorrect response is to permit a simple method of machine scoring. The machine collating of either test *or* instructional results can be accomplished by a simple device employing four photo-electric cells to sense serially the holes in the card, and an electronic logic circuit that will activate a counter *when any two or more* photocells "see" a light source.

There are a number of advantages to such a method of scoring not to be found in existing test-scoring devices:

(1) The method does not require the use of a scoring-template of correct answers customarily required in test scoring devices; nor does the machine require any special adjustments in preparation for the scoring of a given test, or instructional program.

(2) Cards from a variety of tests or instructional programs with differing correct-answer patterns can be indiscriminately processed through the machine.

(3) The device will successfully score cards having varying numbers of choices for the various questions on a given test or instructional program.

(4) The method provides for *both* the scoring of conventional *tests* and the scoring of responses to *instructional programs.*

Existing test-scoring machines require "right-answer templates" and are capable of scoring conventional tests, since it is only necessary to determine whether or not the correct answer was given, *however* such devices are not capable of scoring responses to multiple-choice instructional programs. In the former application the objective is to provide a score for the purpose of giving the student a grade; in the latter application the objective is to indicate the extent to which the program steps have been successfully mastered by the student *on the first try.* Since the student is required to respond until the correct answer is given, and may therefore respond in any or all of four positions, a scoring machine is required that is capable of indicating when *two or more* of the multiple positions on the card have been punched.

The analysis of the responses in an instructional program is important not only in the evaluation of the success of the program with an *individual student,* but also in connection with the analysis of the success that *groups* of students have had with the *individual items* of the program. The item analysis of large amounts of data in connection with this last point is made possible with the present invention by the fact that the responses are punched into cards that can be processed at high speed through standard I.B.M. data processing equipment programmed to sense the double-punching.

Advantages of the invention

It will be clear to those in the educational field that the invention provides the following important advantages.

(1) Indicates a failure to answer all questions.

In order to implement the simplified scoring method above described, the invention provides for use on tests of cards pre-punched with the correct answers. But with such cards, it is necessary to provide some means of knowing whether the student has answered the questions. Otherwise, the return of the pre-punched card would indicate a perfect score.

With the present invention the combination of the control shuttle and the registration of question numbers in the window 31 provide means of readily ascertaining whether the student has answered the questions. In this manner the recording device forces a student to give a punched response to each question, or his failure to do so is readily apparent.

(2) The examinee is automatically given the number of the next question.

In using the recording device on tests, the shuttle automatically moves on to the next question as soon as an answer is punched. Thereupon the number of the next question automatically appears in the window 31. This helps the examinee to "keep his place" in the examination, and prevents him from inadvertently punching answers in rows already completed.

(3) New method of collating a teaching exercise.

The phrase "teaching exercise" is used herein to include both tests and instructional programs.

The present invention provides features that make possible the collating of the results of teaching exercises of both types in a single, simple machine.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. In an educational device for recording answers to multiple choice questions on a punch card, which comprises a manual holder, a punch card mounted in the holder, and a stylus, the holder being provided with numbered rows of openings for admission of the stylus to the punch card, the improvement which comprises:
(1) means for requiring a student to answer the questions in sequence, said means including a shuttle movable laterally and spring-biased longitudinally of the holder;
(2) the shuttle being provided with openings corresponding with all openings of a row of openings in the holder;
(3) the stylus being provided with means operable to move the shuttle laterally thereby permitting the shuttle to move under spring bias to the next row of openings in the casing, when the stylus is fully inserted in an opening.

2. A device as specified in claim 1 wherein the shuttle is spring-biased downward toward the last of the numbered rows of openings, and is guided in stepwise downward movement by means of pins engaged in zigzag grooves formed on the inside of the casing.

3. A device as specified in claim 1 wherein the operating means for the shuttle comprises a thin, flat spring attached to the shuttle, the shuttle and spring being wide enough to cover all of the openings of a row of openings.

4. A device as specified in claim 3 wherein the face of the steel spring carries numbers corresponding serially with the numbers of the rows of openings, and the case is provided with a window through which the numbers are visible.

5. A device as specified in claim 1 wherein the punch card is supported on a punching plate which comprises a resilient sheet bonded to a metal plate, the punching plate being formed with openings which are aligned with the numbered rows of openings in the casing.

6. In an educational device for recording an answer to a multiple choice question, which comprises a case adapted to hold the punch card, and a stylus, the case being provided with numbered rows of openings for admission of the stylus to the punch card, the improvement which comprises:
(1) the opening of the numbered rows of openings in the case having a circular center portion with communicating lateral slots which form a double-keyhole configuration;
(2) means for requiring the student to answer the questions in sequence, said means including a shuttle and a spring connected to the shuttle;
(3) the shuttle being provided with a row of rectangular openings positioned so as to cooperate with a row of openings in the case,
the rectangular openings of the shuttle being normally offset from the double-keyhole openings of the case so that the shuttle will cover one of the lateral slots of each of the double-keyhole openings;
(4) the stylus having lateral fins to give the stylus a cross-sectional shape corresponding with the shape of the double-keyhole openings;
whereby, when the stylus is fully inserted in one of the double-keyhole openings, one of the fins of the stylus will engage the side of a rectangular opening to shift the shuttle laterally, permitting the shuttle to be moved downwardly by the spring.

7. A device as specified in claim 6 in which the flat spring biases the shuttle toward the last row of openings in the case.

8. A device as specified in claim 7 in which the shuttle is guided in a stepwise downward movement by zigzag grooves formed in the case, the grooves having horizontal flat portions which position the shuttle for cooperation with each row of openings in the case.

9. A device as specified in claim 7 in which the punch card is adapted to be supported on a punching plate which comprises a resilient sheet bonded to a metal plate, the punching plate being formed with openings which are aligned with the numbered rows of openings in the casing.

10. A device as specified in claim 7 in which the flat steel spring carries numbers corresponding serially with the numbers of the rows of openings, and the case is provided with a window through which the numbers are visible.

11. A device as specified in claim 6 in which the case carries a removable answer template located below the punch plate, the template being formed with openings at positions corresponding with the correct answers.

References Cited by the Examiner
UNITED STATES PATENTS

| 1,749,226 | 3/1930 | Pressey | 35—9 |
| 3,151,403 | 10/1964 | Sinex | 35—48.1 |
| 3,166,858 | 1/1965 | Huetten | 35—9 |

EUGENE R. CAPOZIO, *Primary Examiner.*

R. E. KLEIN, *Assistant Examiner.*